Sept. 8, 1925.
W. H. PETERSEN
COFFEE URN
Filed Dec. 1, 1924 4 Sheets-Sheet 2
1,552,947
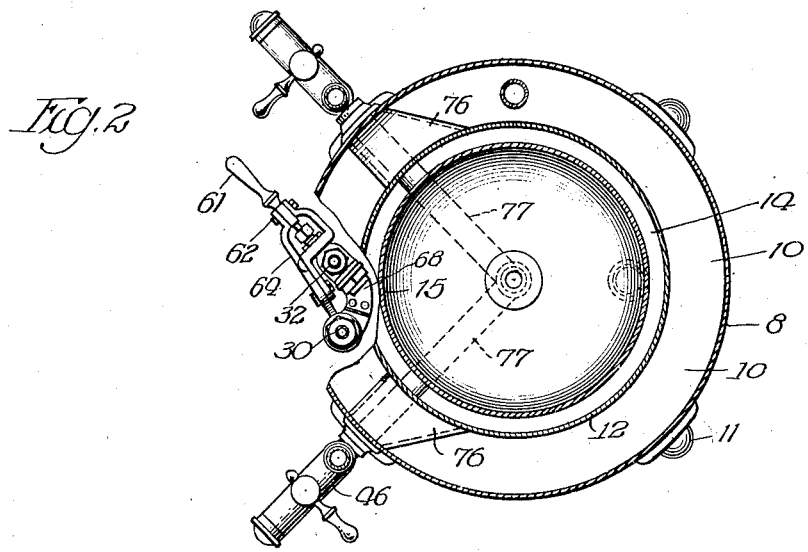
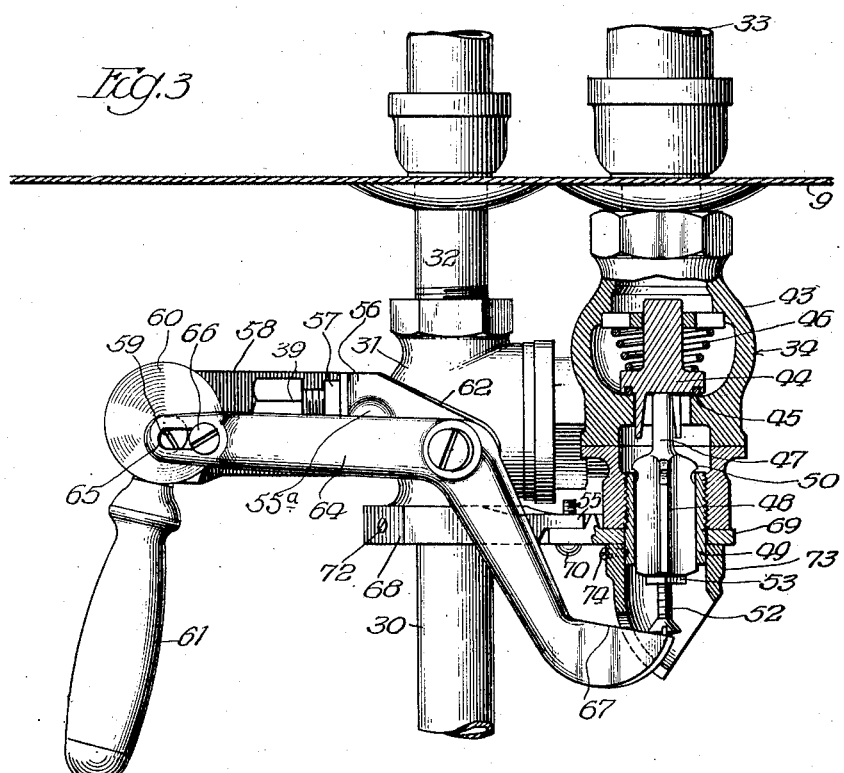

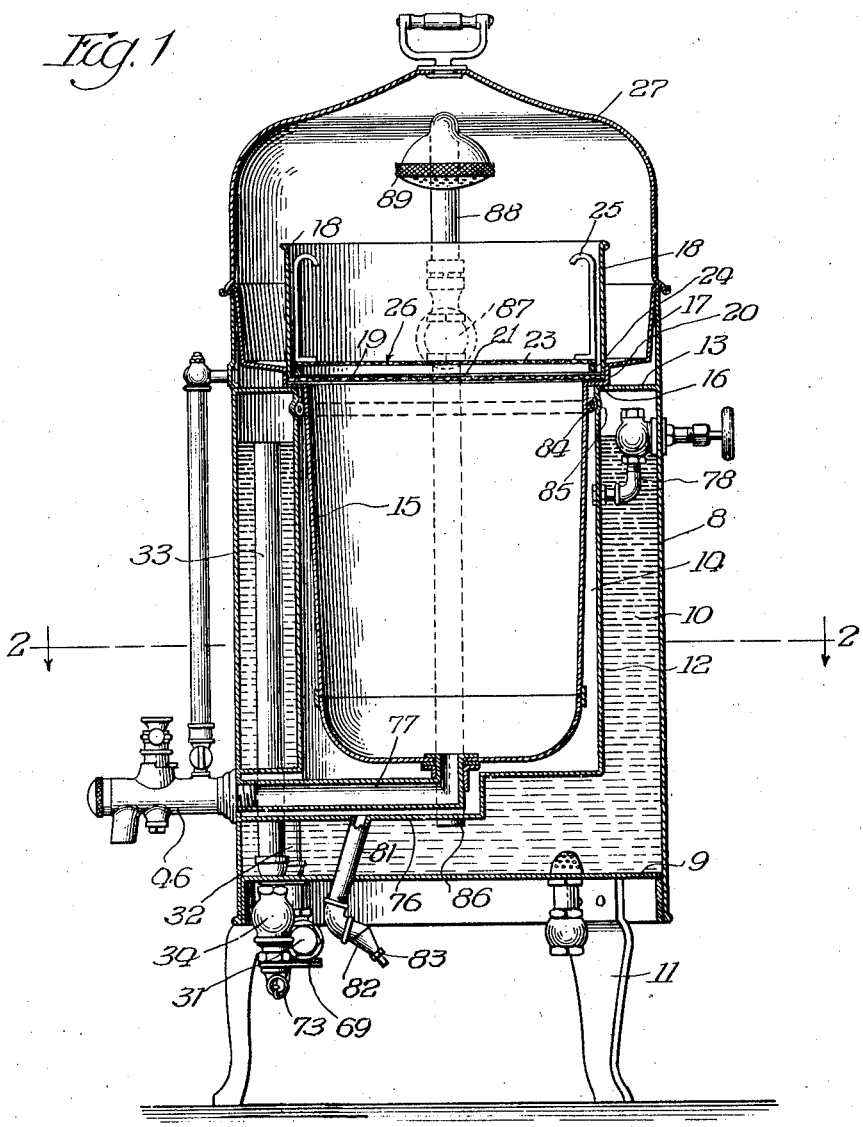

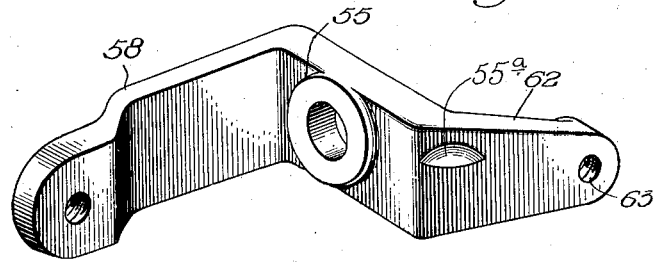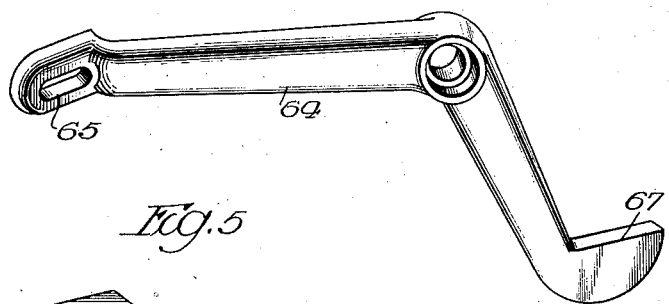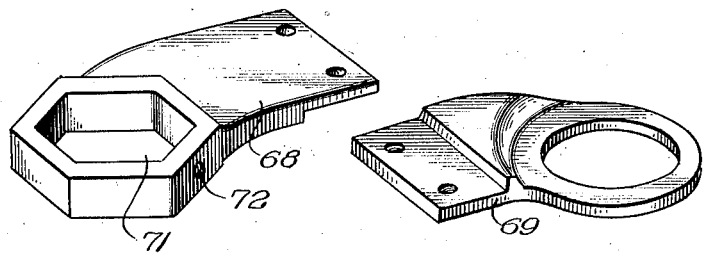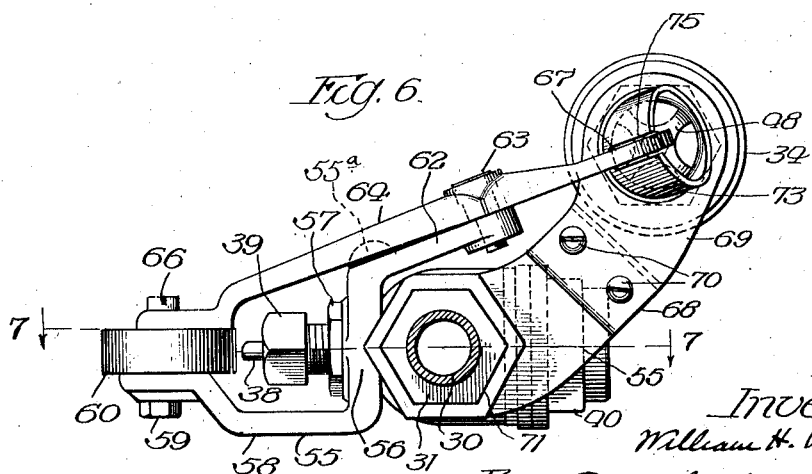

Sept. 8, 1925.  W. H. PETERSEN  1,552,947
COFFEE URN
Filed Dec. 1, 1924   4 Sheets-Sheet 4
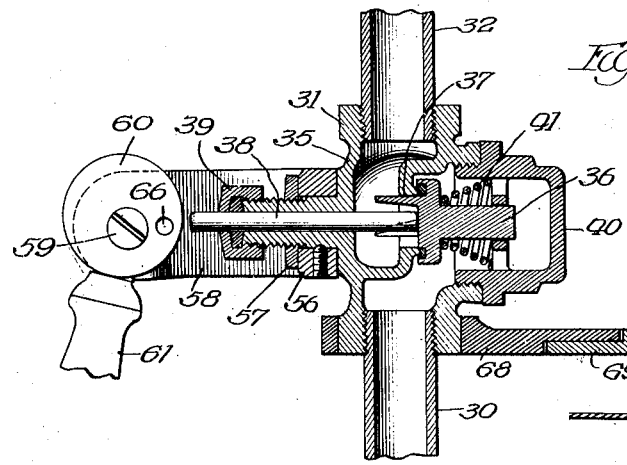
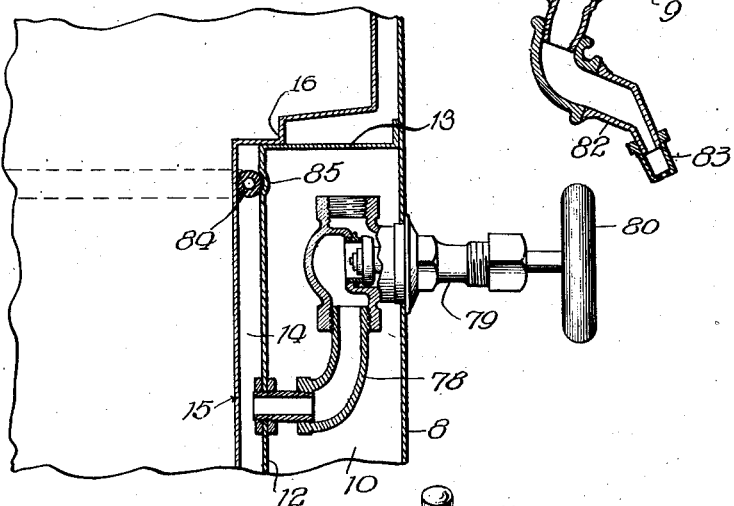
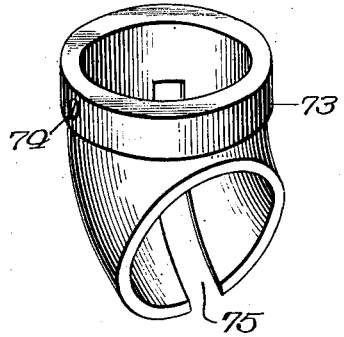
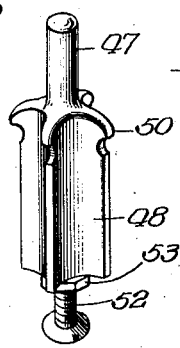
Inventor:
William H. Petersen
By Fred Gerlach Atty.

Patented Sept. 8, 1925.

1,552,947

UNITED STATES PATENT OFFICE.

WILLIAM H. PETERSEN, OF CHICAGO, ILLINOIS, ASSIGNOR TO ALBERT PICK & COMPANY, OF CHICAGO, ILLINOIS, A CORPORATION OF ILLINOIS.

COFFEE URN.

Application filed December 1, 1924. Serial No. 753,117.

*To all whom it may concern:*

Be it known that I, WILLIAM H. PETERSEN, a citizen of the United States, and a resident of Chicago, in the county of Cook and State of Illinois, have invented certain new and useful Improvements in Coffee Urns, of which the following is a full, clear, and exact description.

The invention relates to coffee urns.

One object of the invention is to provide improved means for conjointly operating the water inlet valve and overflow valves. Another object of the invention is to provide means for heating the air chamber between the coffee jar and the water chamber, whenever for any reason it should be desired to raise the temperature of the coffee in the jar. A still further object is to provide means for preventing steam in said air chamber from escaping upwardly from the chamber.

The invention consists in the several novel features hereinafter set forth and more particularly defined by claims at the conclusion hereof.

In the drawings: Fig. 1 is a vertical section of an urn embodying the invention. Fig. 2 is a horizontal section on line 2—2 of Fig. 1. Fig. 3 is an enlarged side elevation of the devices for conjointly operating the water inlet and overflow valves, parts being shown in section. Fig. 4 is a perspective of the bracket for supporting the cam for operating the inlet valve and the lever for operating the overflow valve. Fig. 5 is a perspective of the sectional bracket for rigidly connecting the casings of the overflow and water inlet and overflow valves. Fig. 6 is an enlarged inverted plan, parts being shown in section. Fig. 7 is a section on line 7—7 of Fig. 6. Fig. 8 is a detail of the connection for delivering steam into the air chamber. Fig. 8ª is a detail of the condensation drain for the air-chamber. Fig. 9 is a perspective of the guide-sleeve at the lower end of the water-inlet valve. Fig. 10 is a perspective of the stem for operating the overflow valve.

The invention is exemplified in an urn comprising a body having a cylindrical outer wall 8 and a bottom 9, in which is formed a chamber 10 for the water to be percolated through the coffee. This body is suitably supported by legs 11. An inner cylindrical wall 12 is joined to the body-wall 8 by an annular horizontal wall 13 and forms an air chamber 14. A jar or receptacle 15, adapted to contain the liquid coffee, is removably held in chamber 14, being provided with a ledge 16 which is adapted to rest on the wall 13 and is provided with an upwardly extending wall 17 which extends over the rim of wall 8. A retainer for the ground coffee is removably supported above the jar 15 and comprises an imperforate cylindrical side wall 18 and a foraminous bottom 19. This retainer has an open top and its bottom rests on the ledge 16 of jar 15, the latter being provided with a vertically extending portion 20 to secure the retainer against lateral movement. The filter sheet 21 is placed on the bottom of the percolator and a foraminous disk 23 on a ring 24 holds the filter-sheet over the retainer bottom 19. Handles 25 are fixed to ring 24 for convenience in lifting the disk 26 into and out of the retainer. The removable cover 27 rests on the top rim of the body.

A water-supply pipe 30 is connected to a valve 31 and a pipe 32 delivers water under control of the valve into the lower portion of the water-chamber 10. The urn is designed to receive a predetermined volume of water for delivery into the percolator and an overflow pipe 33 has its open upper end located at the proper elevation for this purpose. This overflow pipe extends downward through the bottom 9 and is connected to a valve 34. The valve 31 comprises a casing 35, a valve-plunger 36, adapted to close, on a seat 37 and provided with a stem 38 which is slidably mounted in a suitable packing box 39 connected to the casing. This plunger and its stem are removable from the casing through a screw-plug 40, when re-grinding or repair of the valve becomes necessary. The valve-stem 38 is mounted to operate horizontally and is normally closed by a spring 41. The overflow valve 34 comprises a casing 43, a valve-plunger 44, adapted to close upon a seat 45, and a spring 46 for holding the valve-plug normally closed. A stem 47 is integral with guide-ribs 48 which are vertically slidable in a pipe nipple 49 which is screw-threaded into the lower end of the valve casing 43. Ribs 48 are provided with stop-lugs 50 to limit the downward movement of the valve-stem. A screw 52, threaded to said stem and adapted to be adjustably locked by a nut 53, serves as an adjustable abutment for a lever which is adapted to shift the stem to open the overflow valve.

A desideratum in these urns is to use slide valves of standard construction, and the operating mechanism for conjointly operating the water inlet and overflow valves, presently to be described, is adapted for attachment to valves of this character. A bracket 55 has a portion 56 fitting around the portion of valve-casing 35 through which stem 39 extends and is adapted to be clamped to said casing by a nut 57 threaded to said portion of the casing. This bracket comprises an arm 58, which extends longitudinally of and at one side of the valve stem 38, and carries a pivot-screw 59 at its outer end. A cam or eccentric 60 is pivoted on said screw and its periphery is adapted to engage the end of stem 38 to open the valve-plunger 36 against the force of spring 41. An operating handle 61 is affixed to and extends radially from the periphery of the cam 60. The bracket 55 is provided with an integral rearwardly extending arm 62 which carries at its rear end a pivot pin 63 for a lever 64 which is for operating the overflow valve. This lever has an arm with a slot 65 therein for an eccentric pin 66 on the cam 60, so that the lever will be shifted when the cam is rotated. The lever is also provided with an integral rearwardly extending arm having a portion or abutment 67 which extends under the abutment screw 52, so that when the lever 64 is shifted from its normal position by cam 60, the screw 52 will be shifted by the lever to open the overflow valve. A lug 55ª is integrally formed on the rearwardly extending arm 62 of bracket 55 to limit the upward movement of lever 64 and thus hold abutment 67 against the head of screw 52 so that there will be no lost motion therebetween.

To maintain a secure connection between the casings of the water inlet and overflow valves, a sectional bracket comprising members 68 and 69 secured together by screws 70 is provided. Member 68 is provided with a hexagonal opening 71 fitting around the usual hexagonal end of the valve-casing 35 and is detachably secured thereto by a jamb-screw 72. A sleeve 73 fits around the lower end of nipple 49 and is secured thereon by a screw 74. Bracket-section 68 is provided with a portion which fits around the nipple and is held on the inlet valve casing by the sleeve 73. The latter is also slotted, as at 75, to guide the end 67 of lever 64.

In operation, the turning of handle 61 will rotate the cam 60 and push the stem 38 of the water inlet valve inwardly and cause it to be opened against the force of its closing spring. Simultaneously, the pin 66, turning with cam 60, will swing lever 64 to cause the abutment 67 to engage screw 52 and open the overflow valve. Reverse shift of the lever will permit the closing of both of these valves by their closing springs.

This construction exemplifies one in which standard self-closing valves are used for the water inlet and overflow valves. The supporting structure for the valve operating devices are attachable to valves of standard construction, so that no structural change in them is necessary. In the operation of coffee urns, it has been found that the spring-closed valves of the plunger type are most efficient and less likely to become leaky. The bracket for cross-connecting the valve casing is also applicable to valve casings of standard construction.

One or more brackets 76 are connected to the bottom of the coffee jar 15, as well understood in the art. In practice, it is desirable to extend the air chamber 14 around pipes 77 which lead from the jar to the faucets to prevent the coffee in the pipe from being cooled when cold water is introduced in the water chamber 10. It has been found, in practice, that it is sometimes desirable to conduct heat directly into the air space 14 and, for this purpose, a pipe 78 is connected under control of a valve 79 to conduct steam from the chamber above the water column in chamber 10 into the air chamber 14. The operating handle 80 of valve 79 is disposed on the outside of the urn, so that whenever it may be desired to heat the chamber 14 in this manner, it can be conveniently done. To provide for the drainage of the condensate from chamber 14, an angular pipe 81 is connected to the bottom wall of the air chamber 14 and the elbow fitting 82 is connected to this pipe. A nozzle 83, with a restricted outlet, is screw-threaded to the lower end of fitting 82. This permits the condensate to escape from the air chamber. In order to prevent the upward escapement of the steam, an annular gasket 84, which is circular in cross section, is held in an annular groove 85 formed in the wall 12 and forms a resilient closure between the jar 15 and the wall 12, to prevent the upward escapement of steam from the air chamber when it is directly heated thereby. Any suitable means well understood in the art, such as a steam coil in the water chamber or a subjacent burner may be used to heat the water in chamber 10. The construction described exhibits one in which provision is made for delivering steam from the top of the water chamber into the steam chamber when occasion therefor arises and for preventing the upward escapement of steam from the air chamber.

A percolator pipe 86, having its lower end open and disposed adjacent the bottom of the chamber 10, extends upwardly to a valve 87 and an elbow pipe 88, connected to said valve, conducts the water to a rosette sprayer 89 which is centrally positioned over the ground coffee retainer 18. The water percolates through this pipe when the valve 87 is open and is discharged over the ground coffee, from which it drips into the jar, as well understood in the art.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a coffee urn, the combination of a receptacle having a water chamber therein, a coffee jar, a pipe for controlling the supply of water to said chamber, an overflow pipe for the water in said chamber, a self-closing valve for controlling the flow of water into the chamber, a self-closing valve for said overflow pipe, said valves having separate casings, and means for conjointly operating the valves to simultaneously open and close them.

2. In a coffee urn, the combination of a receptacle having a water chamber therein, a coffee jar, retaining means for the ground coffee, means for delivering water from the chamber to the ground coffee, a pipe for controlling the supply of water to said chamber, an overflow pipe for the water in said chamber, a valve for controlling the flow of water into the chamber, a valve for said overflow pipe, and means for operating the valves to simultaneously open and close them, comprising a cam for operating one valve and a lever operated by the cam for operating the other valve.

3. In a coffee urn, the combination of a receptacle having a water chamber therein, a coffee jar, retaining means for the ground coffee, means for delivering water from the chamber to the ground coffee, a pipe for controlling the supply of water to said chamber, an overflow pipe for the water in said chamber, a self-closing valve for controlling the flow of water into the chamber, a self-closing valve for said overflow pipe, and means for operating the valves to simultaneously open and close them, comprising a cam for operating one valve and a lever operated by the cam and for operating the other valve, 4. In a coffee urn, the combination of a receptacle having a water chamber therein, a coffee jar, a pipe for controlling the supply of water to said chamber, an overflow pipe for the water in said chamber, a valve for controlling the flow of water into the chamber, a valve for said overflow pipe, said valves have separate casings, a bracket separate from and attachable to one valve-casing, and means for conjointly operating both of said valves supported by said bracket.

5. In a coffee urn, the combination of a receptacle having a water chamber therein, a coffee jar, a pipe for controlling the supply of water to said chamber, an overflow pipe for the water in said chamber, a self-closing valve for controlling the flow of water into the chamber, a self-closing valve for said overflow pipe, said valves having separate casings, a bracket separate from and attachable to one valve-casing, and means for conjointly operating both of said valves supported by said bracket.

6. In a coffee urn, the combination of a receptacle having a water chamber therein, a coffee jar, a pipe for controlling the supply of water to said chamber, an overflow pipe for the water in said chamber, a self-closing valve for controlling the flow of water into the chamber, a self-closing valve for said overflow pipe, said valves having separate casings, a bracket attachable to one valve-casing, and means for conjointly operating both of said valves comprising a cam and lever supported by said bracket.

7. In a coffee urn, the combination of a receptacle having a water chamber therein, a coffee jar, a pipe for controlling the supply of water to said chamber, an overflow pipe for the water in said chamber, a valve for controlling the flow of water into the chamber, a valve for said overflow pipe, said valves having separate casings, an attachable separate cross-connection between and having openings therein to fit around the ends of the valve casings, and means for operating the valves.

8. In a coffee urn, the combination of a receptacle having a water chamber therein, a coffee jar, a pipe for controlling the supply of water to said chamber, an overflow pipe for the water in said chamber, a valve for controlling the flow of water into the chamber, a valve for the overflow pipe, the valves having separate casings, an attachable cross-connection between the valve-casing, a supporting bracket attachable to one casing, and means for operating the valves mounted on said bracket.

9. In a coffee urn, the combination of a receptacle having a water chamber therein, a coffee jar, a pipe for controlling the supply of water to said chamber, an overflow pipe for the water in said chamber, a valve for controlling the flow of water into the chamber, a valve for the overflow pipe, the valves having separate casings, an attachable cross-connection between the valve-casing, a supporting bracket attachable to one casing, and means mounted on said bracket, for conjointly opening both of the valves.

10. In a coffee urn, the combination of a receptacle having a water chamber therein, a coffee jar, a pipe for controlling the supply of water to said chamber, an overflow pipe for the water in said chamber, a self-closing valve for controlling the flow of water into the chamber, a self-closing valve for said overflow pipe, said valves having separate casings, an attachable separate cross-connection between the casings, a supporting bracket attachable to one casing, and a cam pivoted on the bracket for opening one valve and a lever mounted on the bracket for opening the other valve.

11. In a coffee urn, the combination of a receptacle having a water chamber therein, a coffee jar, means for retaining ground coffee, means for delivering water to the ground coffee, an air chamber between the jar and said water chamber, and a pipe for delivering steam from the top of the water chamber into the air chamber.

12. In a coffee urn, the combination of a receptacle having a water chamber therein, a coffee jar, means for retaining ground coffee, means for delivering water to the ground coffee, an air chamber between the jar and said water chamber, a pipe for delivering steam from the top of the water chamber into the air chamber, and a valve for said water chamber and operable from the outside for the flow to the air chamber.

13. In a coffee urn, the combination of a receptacle having a water chamber therein, a coffee jar, means for retaining ground coffee, means for delivering water to the ground coffee, an air chamber between the jar and said water chamber, a pipe for delivering steam from the top of the water chamber into the air chamber, and a gasket around the outside of the jar to prevent steam from escaping upwardly from the air chamber.

14. In a coffee urn, the combination of a receptacle having a water chamber therein, a coffee jar, means for retaining ground coffee, means for delivering water to the ground coffee, an air chamber between the jar and said water chamber, a pipe for delivering steam from the top of the water chamber into the air chamber, the wall around the air chamber having a groove therein, and a gasket around the outside of the jar and in said groove for preventing steam from escaping upwardly from the air chamber.

15. In a coffee urn, the combination of a receptacle having a water chamber therein, a coffee jar, means for retaining ground coffee, means for delivering water to the ground coffee, an air chamber between the jar and said water chamber, a pipe for delivering steam from the top of the water chamber into the air chamber and a restricted outlet for the condensate in the bottom of the air chamber.

Signed at Chicago, Illinois this 21st day of November, 1924.

WILLIAM H. PETERSEN.